Sept. 22, 1925. 1,554,821
S. T. HARRISON ET AL
MACHINE FOR SIFTING POTTERS' SLIP AND OTHER GRANULAR
OR PULVERULENT MATERIALS
Filed April 23, 1923 6 Sheets-Sheet 5
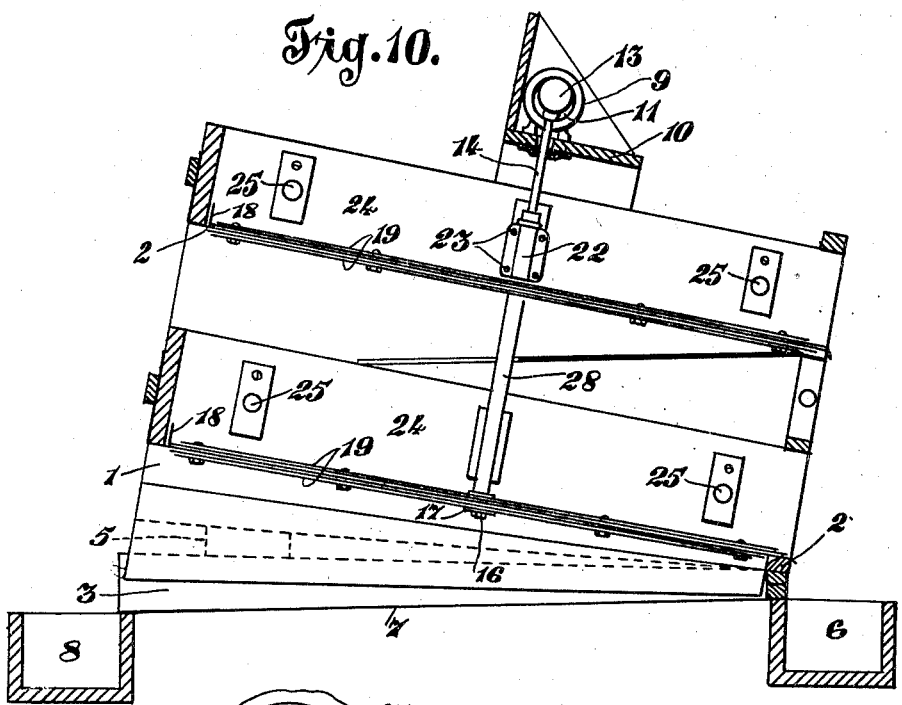
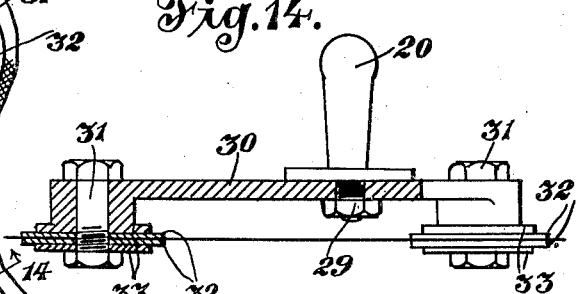
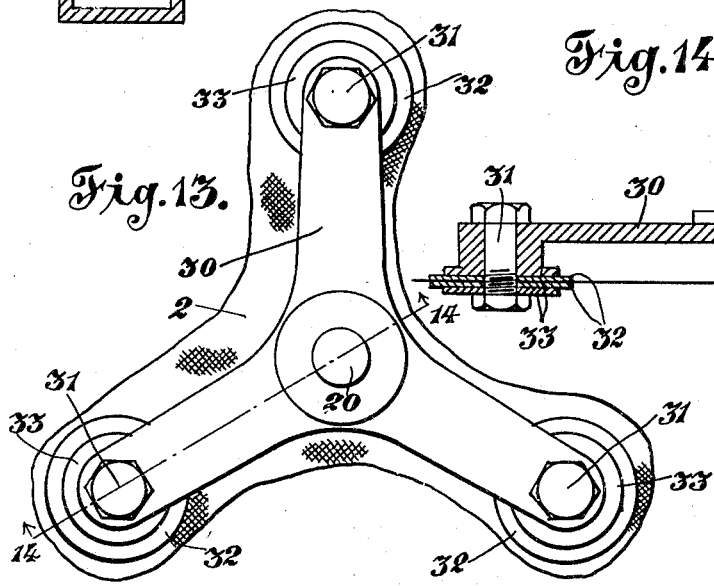

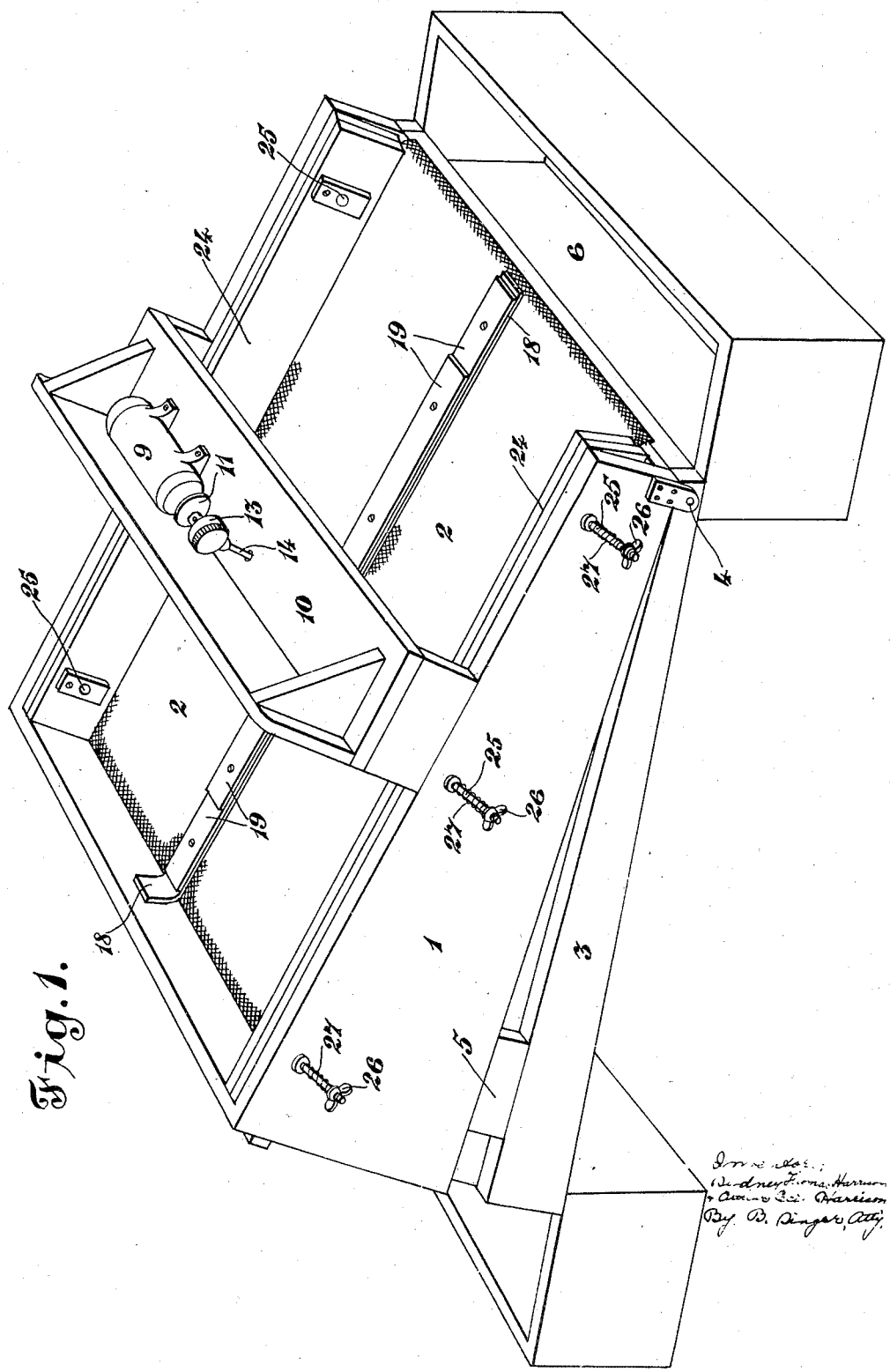

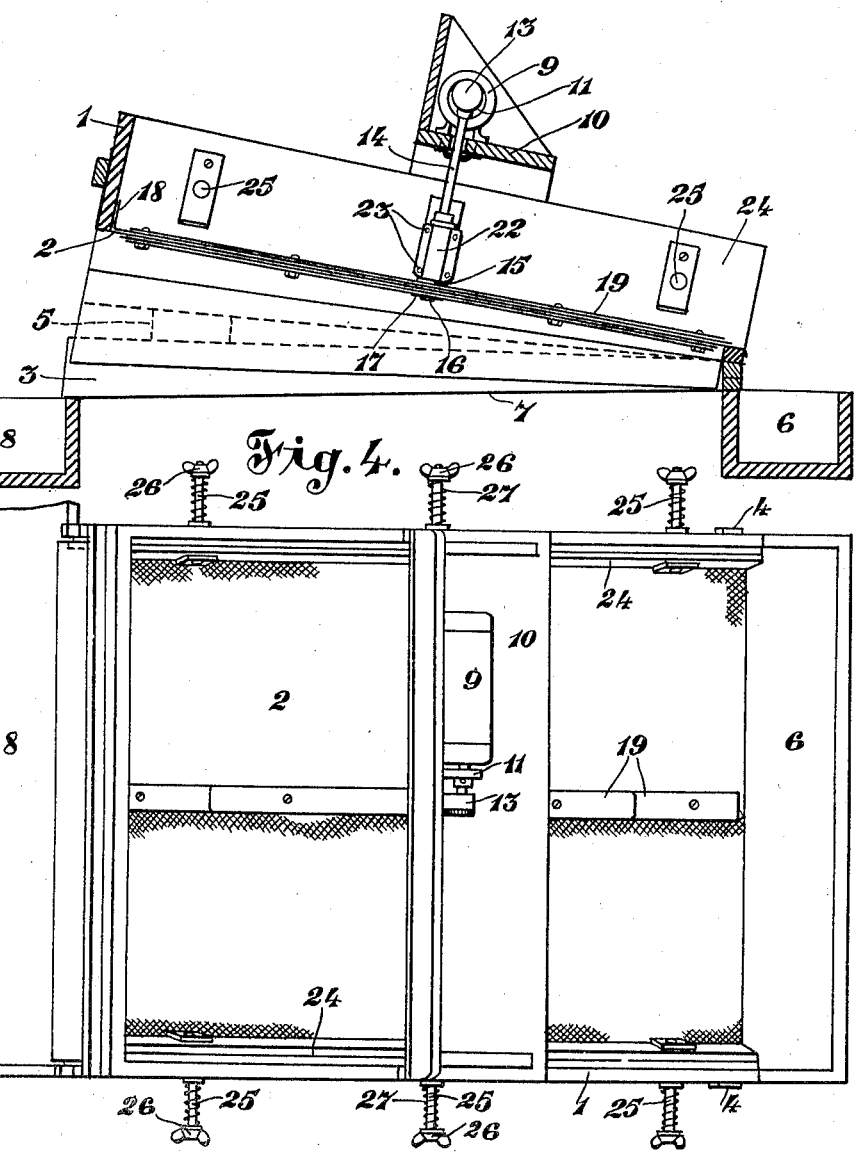

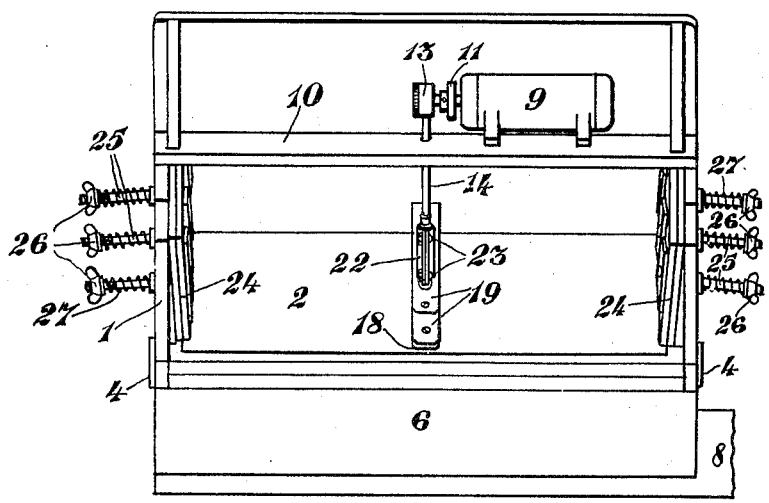
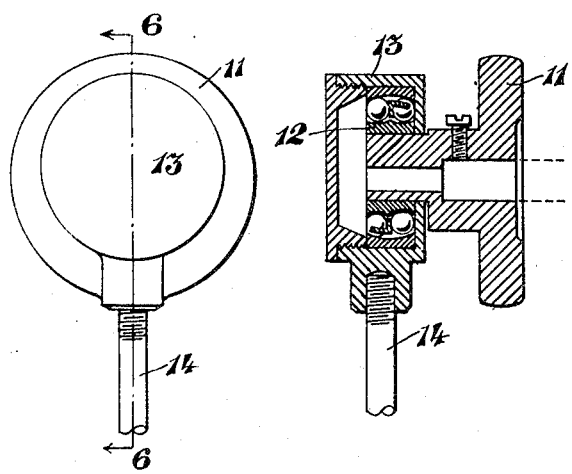

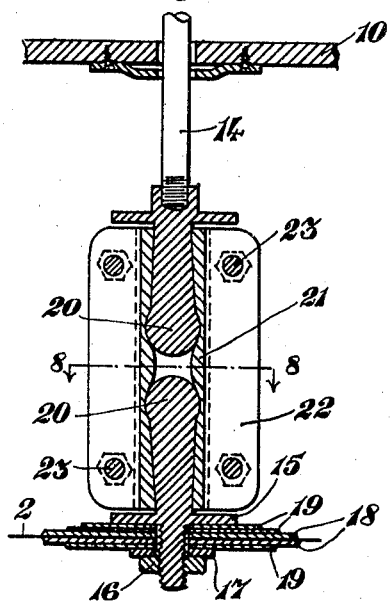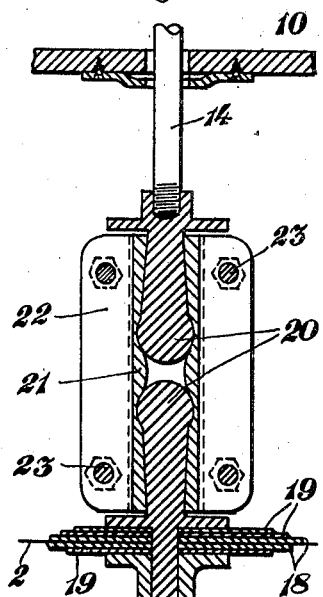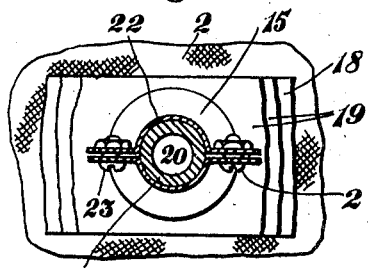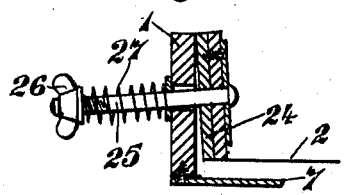

Patented Sept. 22, 1925.

1,554,821

UNITED STATES PATENT OFFICE.

SYDNEY THOMAS HARRISON AND ARTHUR CECIL HARRISON, OF STOKE-ON-TRENT, ENGLAND.

MACHINE FOR SIFTING POTTERS' SLIP AND OTHER GRANULAR OR PULVERULENT MATERIALS.

Application filed April 23, 1923. Serial No. 633,990.

*To all whom it may concern:*

Be it known that we, SYDNEY THOMAS HARRISON and ARTHUR CECIL HARRISON, subjects of the Kingdom of Great Britain, both residing at Phoenix Chemical Works, Bath Street, Hanley, Stoke-on-Trent, in the county of Stafford, England, have invented certain new and useful Improvements in Machines for Sifting Potters' Slip and Other Granular or Pulverulent Materials, of which the following is a specification.

This invention comprises certain improvements in vibratory screens or sifting machines, and more particularly relates to apparatus of the type in which a rapid non-impactive vibration is applied direct to the screening or sifting surface by means of a rotating element driven by an electric motor mounted over the machine and coupled direct to said rotating element.

Apparatus of this type has been proposed in which an unbalanced rotary element, connected through a flexible coupling to the motor, is freely and concentrically rotatable within a casing having a direct connection to the screening or sifting surface by means of supporting posts and bolts, the vibration being produced by said unbalanced rotary element, by reason of the eccentricity of its centre of gravity. A further apparatus of the type referred to has also been proposed in which an unbalanced rotary element, connected direct to the motor, is concentrically rotatable within a casing having a bearing connection upon the screening or sifting surface by means of transmitting plates and bearing blocks or strips, the vibration being produced by said unbalanced rotary element by reason of the eccentricity of its centre of gravity, and ball bearings being interposed between the unbalanced rotary element and its concentrically enclosing casing. Moreover it has been proposed in each of these forms of apparatus, to carry the screening or sifting surface by its longitudinal edges upon tubular side clamp devices within the sieve frame proper, and to adjust the tension of said screening or sifting surface by means of screw devices whereby one of said tubular side clamps is adapted for movement in relation to said sieve frame proper.

The present invention is intended mainly for the sifting or "lawning" of potters' slip and the like, but is applicable also for the sifting of other granular or pulverulent materials, either wet or dry, and the invention has for its purpose the provision of a machine which shall be of simple and economical construction, adapted to be driven at a particularly high vibratory speed, which shall be of great strength and durability under such continuous and rapid vibration, and which shall have a sifting action of a particularly effective and expeditious character.

According to the present invention a sifting machine of the type first herein referred to, is characterized by the rotating element being eccentrically rotatable within and in direct bearing contact with a casing having an eccentric rod connection direct to the lawn or lawns, to thereby produce the vibration in a positive form.

Provision is made for a flexible joint in connection with said eccentric rod, which may also have a ball-bearing mounting, and provision may be made for a flexible clamping strip connection between the eccentric rod and the lawn or lawns for the purpose of protecting the fabric of the lawn or lawns and equalizing the vibration over the length thereof. Alternatively the vibration may be applied by means of a plurality of vibrators of similar form, similarly connected to the lawn or lawns. The invention also includes improved provision, independent of the sieve frame proper, for adjusting the tension of the lawn or mesh of each sieve to take up slack produced during the working of the machine, such adjustment provision comprising a false frame or side clamp device within the lawn or sieve frame proper and adapted to carry the lawn or mesh by its longitudinal edges, said false frame or side clamp device being adapted for a flexible tilting movement in relation to said frame proper, under control of a spring-pressed screw or like device. The vibrator, when applied to an ordinary hand lawn, enables the latter to be converted into a mechanically operated sifting machine.

In order that this invention may be clearly understood and readily carried into practice, reference may be had to the appended explanatory sheets of drawings, upon which:—

Figure 1 is an elevation in perspective of a single sieve sifting machine constructed in accordance with the present invention.

Figure 2 is a sectional side elevation of the same.

Figure 3 is a front elevation of the same.

Figure 4 is a plan of the same.

Figure 5 is a side elevation of the eccentric device controlling the movement of the vibrator rod.

Figure 6 is a front elevation of Figure 5, in section on the line 6—6 thereof.

Figure 7 is a sectional side elevation of the flexible joint of the single sieve vibrator rod, according to the construction shown in Figures 1 to 4.

Figure 8 is a plan of Figure 7, in section on the line 8—8 thereof.

Figure 9 is a sectional front elevation of the tensioning device for the lawn or mesh of the sieve.

Figure 10 is a sectional side elevation of a double sieve sifting machine constructed in accordance with the present invention.

Figure 11 is a sectional side elevation of the double sieve vibrator rod, including its flexible joint, according to the construction shown in Figure 10.

Figure 13 is a plan of part of Figure 12, showing the flexible-jointed and multiple-armed connection between the vibrator rod and the lawn or mesh.

Figure 14 is an elevation of Figure 13, in section on the line 14—14 thereof.

Figure 12:
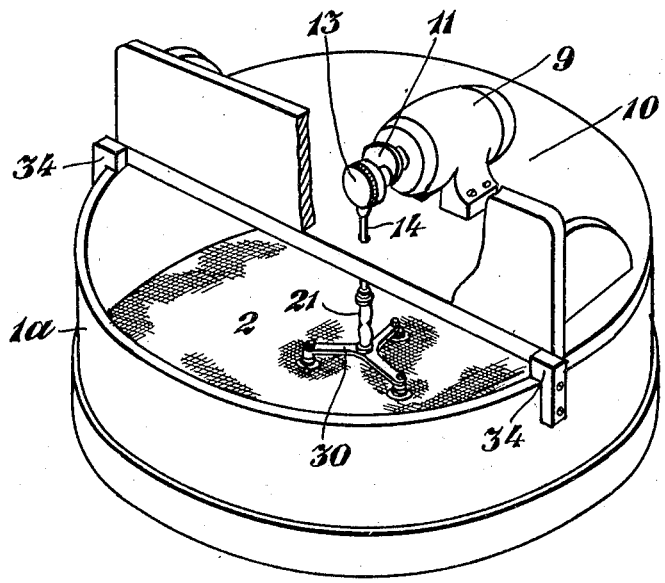
Figure 12 is an elevation in perspective of a modification in which the mechanical vibrator is applied to an ordinary hand lawn.

In a convenient embodiment of the present invention, Figures 1 to 9, an inclined sieve frame 1 of rectangular form and open at its lower end, having a lawn or mesh 2, is mounted upon a rigid under frame 3 which is also of rectangular form, the sieve frame being hinged to the under frame on opposite sides at 4, and being angularly adjustable thereon by means of sliding blocks 5. This sieve is arranged in conjunction with a suitable feed pipe or trough (not shown), a tailings receptacle 6, a rearwardly inclined collecting tray 7 beneath the under frame, and a collecting and discharge box or trough 8, by which the sifted material is carried forward to its next destination. Or the under frame 3 may be dispensed with, and a suitable collecting tray be applied direct to the underside of the sieve frame 1, to receive the sifted material and deliver it into a suitable trough or receptacle for its subsequent treatment.

The vibration necessary for the sifting operation is applied directly and solely to the lawn or mesh 2 of the sieve at a point midway of the width thereof. For this purpose an electric motor 9 is mounted horizontally upon or within a bridge or platform member 10, preferably having an enclosing cover (not shown), this motor 9 having a coupling 11 to a small ball-bearing eccentric 12, fitted within a casing 13, having an eccentric rod 14 which provides a connection to the sieve beneath. The eccentric rod 14 extends vertically downwards and passes through the lawn or mesh 2 of the sieve, the connection to the lawn or mesh being provided by means of a flange 15, nut 16, and washer 17, in conjunction with rubber or other flexible strips 18 extending longitudinally of the lawn or mesh at top and bottom and secured by metal clamping strips 19. The eccentric rod 14 also includes a flexible joint, this being provided by having the rod of a divided form with enlarged opposed heads 20, which latter are enclosed within a rubber or other flexible sleeve or intermediate packing 21, which in turn is enclosed within a divided sleeve clamp 22, the pressure of which is adjustable by bolts 23.

By this means the rotation of the horizontal shaft of the eccentric 12 is converted into a smooth and extremely rapid non-impactive vibratory movement, which is applied directly and solely to the lawn or mesh of the sieve, at a point midway of the width thereof, with the sieve frame 1 remaining stationary and perfectly rigid upon the machine frame 3, and with the flexible clamping strip connection effectively protecting the fabric of the lawn or mesh 2 and equilizing the vibration over the length thereof.

To provide for adjustment of the tension of the lawn or mesh 2 of the sieve, to take up slack produced during the working of the machine, the lawn or mesh 2 may be carried by the sieve frame 1 in conjunction with an internal false frame 24 having a hinged or tilting connection to the frame 1, the hinged or tilting movement of this false frame 24 being controlled by means of a series of screw bolts 25 passing transversely through the sieve frame 1 and through the false frame 24; this false frame 24 may comprise opposite longitudinal pairs of strips or clamps arranged in facial contact so as to clamp the opposite longitudinal edges of the lawn or mesh 2 between them, which clamps may if desired be suitably hinged to the sides of the sieve frame 1, but the hinged or tilting movement of the clamps, by means of thumb nuts 26 and spiral springs 27 on said screw bolts 25, providing the means of readily securing the necessary tension to the lawn or mesh 2.

In a modified embodiment of the invention, Figures 10 and 11, the vibratory motion of the eccentric rod 14 is applied directly and solely to the lawns or meshes 2 of a superposed pair of sieves, also at a point midway of the width thereof, the arrangement being similar to that already described, except that the screwed connection provided by the nut 16 and washer 17 is applied to the lower sieve only, a flanged spacing sieve 28 being assembled loosely upon the extended part of the eccentric rod 14 between the pair of sieves.

If desired the vibratory movement of the eccentric rod 14 may be applied directly and solely in a similar manner to the lawns or meshes of a multiple sifting machine having any convenient number of superposed sieves.

In a further modification, Figures 12 to 14, the mechanical vibrator is applied to an ordinary hand lawn, to thereby convert the latter into a mechanically operated sifting machine. In this arrangement the bridge or platform member 10, with its electric motor 9, coupling 11, ball-bearing eccentric 12 in casing 13, and eccentric rod 14, all as previously described, is simply laid against stops 34 on the top of the ordinary circular hand lawn or sieve frame 1ª, the eccentric rod 14 having a central screwed connection at 29 to a multiple-armed member 30 which at its extremities provides direct concentric connections to the lawn or mesh 2 by means of bolts 31 cooperating with rubber or other flexible washers 32 and metal washers or flanges 33. The clamp 22 previously described in connection with the flexible joint may in this case be dispensed with, the flexible sleeve 21 providing the necessary connection whilst permitting of easy disassembly of the joint when it may be desired to clean the apparatus.

What we claim as our invention and desire to secure by Letters Patent is:—

1. A sifting machine of the class described, comprising a mesh, an element mounted independently of the mesh for rotation and including an eccentric, a closed casing enclosing the eccentric, ball bearings interposed between the eccentric and the casing, and a rod carried by the casing and actuated by the eccentric, said rod being connected directly to the mesh to vibrate the same.

2. A sifting machine of the class described, comprising a mesh, an element mounted independently of the mesh for rotation and including an eccentric, a rod actuated by the eccentric and yieldable means connecting said rod directly to the mesh to vibrate the latter.

3. A sifting machine of the class described comprising a mesh, an element mounted independently of the mesh for rotation and including an eccentric, and a rod actuated by the eccentric and connected directly to the mesh to vibrate the same, said eccentric rod having a flexible joint.

4. A sifting machine of the class described comprising a mesh, an element mounted independently of the mesh for rotation and including an eccentric, and a rod actuated by the eccentric and connected directly to the mesh to vibrate the same, said eccentric rod comprising a pair of members having opposed heads and connecting means including a flexible element between said head members.

5. A sifting machine of the class described, comprising a mesh, an element mounted independently of the mesh for rotation and including an eccentric, a rod actuated by the eccentric and connected directly to the mesh to vibrate the same, a flexible clamping strip connection between the eccentric rod and the mesh, and a flexible-jointed multiple-armed connection between the eccentric rod and the mesh.

6. A sifting machine according to claim 1 including a frame in which the mesh is mounted, and means for adjusting the tension of said mesh to take up slack produced during the working of the machine, and comprising a false frame arranged for flexible tilting movement with respect to said frame, and means to adjust said false frame and hold the same in adjusted position.

In witness whereof we have hereunto set our hands.

SYDNEY THOMAS HARRISON.
ARTHUR CECIL HARRISON.